(12) United States Patent
Cable et al.

(10) Patent No.: US 6,570,859 B1
(45) Date of Patent: May 27, 2003

(54) SATELLITE COMMUNICATION SYSTEM AND SATELLITE FOR SUCH A SYSTEM

(75) Inventors: Julian Cable, Bishop Stortford (GB); Laurent Thomasson, Toulouse (FR); Peter Takats, Notre Dame de L'Ile Perrot (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/469,140

(22) Filed: Dec. 21, 1999

(Under 37 CFR 1.47)

(51) Int. Cl.[7] ............................................. H04B 7/212
(52) U.S. Cl. ..................... 370/323; 370/325; 370/316; 455/12.1; 455/13.2; 455/13.3
(58) Field of Search ............................... 455/11.1, 12.1, 455/13.1, 13.2, 427, 428, 429, 430, 445; 370/315, 316, 319, 321, 322, 323, 325, 326, 310; 725/64, 65, 66, 67, 68, 70, 71

(56) References Cited

U.S. PATENT DOCUMENTS

| | | | |
|---|---|---|---|
| 6,047,162 A | * | 4/2000 | Lazaris-Brunner et al. 455/12.1 |
| 6,240,073 B1 | * | 5/2001 | Reichman et al. .......... 370/319 |
| 6,249,514 B1 | * | 6/2001 | Campanella ................ 370/316 |

* cited by examiner

Primary Examiner—Edward F. Urban
Assistant Examiner—Temica M. Davis
(74) Attorney, Agent, or Firm—Barnes & Thornburg

(57) ABSTRACT

A satellite communication system having a spatial segment comprising at least one satellite, preferably in a geostationary orbit, carrying a multi-beam telecommunication payload and a terrestrial segment comprising access gateways to terrestrial networks each arranged to communicate with the satellite via a forward link uplink beam and a return link downlink beam and user terminals each arranged to communicate with a satellite via a forward link downlink beam and a return link uplink beam, wherein the forward link carries signals multiplexed in time and the return link carries signals multiplexed in frequency and time, the payload comprising; a forward link router for routing signals multiplexed in time from a forward link uplink beam on a frame basis to a forward downlink beam, a return link router for routing signals multiplexed in frequency and time from a return uplink beam on a frequency bank basis to a return link downlink beam, and a mesh communication router for receiving signals multiplexed in frequency and time from a return link uplink beam, generating signals multiplexed in time and routing these signals to a forward link downlink beam.

35 Claims, 3 Drawing Sheets

SATELLITE COMMUNICATION SYSTEM AND SATELLITE FOR SUCH A SYSTEM

FIELD OF THE INVENTION

The present invention relates to satellite communication systems for exchanging data of different bandwidths, data-rates and delay requirements, between terrestrial terminals (user terminals, gateways, etc.) and in particular to such systems that utilise at least one geostationary satellite with a range of beams typically between 5 and 70. The number and size of the beams in the uplink and downlink directions may be different.

An architecture that is currently adopted for satellite communication systems to offer broadband and multimedia services to supplement and enhance service offerings is based on bent pipe geostationary satellite networks. An example of such a system uses Ka-band on the return path (from the user terminals to the gateways) and Ku-band Digital Video Broadcast (DVB) on the forward or outward path (from the gateways to the user terminals). The open and neutral nature of this architecture provides bandwidth-on-demand and broadband access that are both attractive and ubiquitous when compared to terrestrial solutions. However, the current architecture has certain limitations.

Firstly, only one hub or a handful of remote gateways are used to interconnect user terminals to terrestrial networks. This works well for local traffic but requires terrestrial back-haul of traffic when traffic becomes global. The necessity to use terrestrial networks for global traffic significantly increases the costs of operations and makes a satellite solution less attractive for Telecomms operators.

Secondly, this architecture does not allow for direct user terminal to user terminal connectivity, through one satellite hop, where the user terminals are located in different beams of a satellite, known as mesh connectivity,. This limits the use of the satellite communication system because user terminal to user terminal connectivity becomes costly in terms of satellite resource usage (since two hops are required) and can only be used for applications which are not time delay sensitive.

The advancing satellite on-board processing technologies have the long-term objective of providing full connectivity at a packet granularity by the use of on board packet switching and cell relay. However, the high technological risk of this alternative is not compatible with the time scales envisaged for providing the next generation of broadband satellite communication systems. Hence there is a need for intermediate solutions that trade-off features for risks.

An architecture for a satellite communication system to solve the first problem discussed above has been introduced. An on-board processor is used to implement carrier based routing on the return link. In this way a given group of contiguous carriers on the return up-link in a satellite beam number i can be switched to a required gateway down-link j, without demodulation. This provides a drastic simplification of the payload required for return path routing as compared to an onboard switch at a packet granularity. The forward or outward link comprises a continuous TDM stream made of time frames within superframes which are preferably DVB based. The forward up-link TDM streams coming from a gateway on uplink beam k is demodulated, and depending on the air interface, is at least partially decoded, by the satellite payload. An on-board TDM router with the capability of switching frame by frame to the desired satellite downlink beam l according to each position within the superframe. This architecture again allows a simplification of the payload with respect to a switch payload operating at packet granularity, particularly since no buffering is involved.

Thus, the granularity of switching on the return link is a carrier or group of carriers and on the forward link is a frame. It should be noted that the forward link is regenerative and the return link is transparent, ie. non-regenerative.

This approach allows for least cost routing (ie. a direct connection between a user beam i and a gateway beam j irrespective of its location) and significantly reduces the dependence of the system on terrestrial networks for transport of non-local traffic, while minimising the risks associated with on-board processing. However, this system architecture does not provide a mesh connectivity capability in a better way than the initial bent pipe system, as user terminal to user terminal connections require two hops of the satellite. This is not compatible with some time delay sensitive services, such as video conferencing, which customers may require.

OBJECT OF THE INVENTION

The present invention aims to improve upon existing satellite communication systems by improving user terminal to user terminal connectivity, so called mesh connectivity, whilst keeping the technological risk at a manageable level.

SUMMARY OF THE INVENTION

According to a first aspect of the present invention there is provided a satellite communication system having a spatial segment comprising at least one satellite carrying a multi-beam telecommunication payload and a terrestrial segment comprising access gateways to terrestrial networks each gateway arranged to communicate with a/the satellite via a forward uplink beam and a return downlink beam and user terminals each arranged to communicate with a/the satellite via a forward downlink beam and a return uplink beam, wherein the forward link carries signals multiplexed in time and the return link carries signals multiplexed in frequency and time, the payload comprising;

a forward link router for routing signals multiplexed in time from a forward link uplink beam on a frame basis to a forward link downlink beam, a return link router for routing signals multiplexed in frequency and time from a return link uplink beam on a frequency bank basis to a return link downlink beam, and a mesh communication router for receiving signals multiplexed in frequency and time from a return link uplink beam, generating signals multiplexed in time and routing these signals to a forward link downlink beam.

The system according to the present invention allows a community of user terminals included within a same satellite beam to receive a single time division multiplexed stream of data on a forward link downlink which transports data from communications with a mix of gateways and other user terminals. Thus, the system can provide least cost routing and flexible beam connectivity allowing user terminals to communicate directly via one hop of a satellite. The user terminals can be relatively simple and low cost terminals capable of receiving only one receiver chain.

The system according to the present invention is particularly useful for a geostationary satellite as the time delay associated with a double satellite hop can be significant.

In a first preferred embodiment the return link uplink signals are received by the return link router and the return link router routes signals relating to a mesh communication to the mesh processor. This enables dynamic allocation of resource on the return link between access signals destined for gateways and mesh signals destined for other user terminals.

In a second preferred embodiment which is simpler than the first a proportion of the return link uplink signals are received by the return link router and a proportion of the return link uplink signals are received by the mesh processor. However, this reduces the flexibility of the system as the resource on the return link for access and mesh signals is allocated statically.

Each user terminal is allocated a home gateway to which the user terminal must make initial requests for resource on the system and in a preferred embodiment the system additionally comprises a bandwidth on demand controller (BoD) located in each home gateway. Alternatively, the bandwidth on demand controller can be located within the payload of the satellite.

The return link router is preferably transparent. This allows for the use of user terminals which will be compatible with next generations of satellite-based networks providing higher flexibility and connectivity characteristics. On the forward link, the compatibility of data streams with existing and widely used standards, such as DVB, ensures a backward compatibility with existing operator equipment and allows for a minimisation of user terminal receiver cost. The forward link router is preferably regenerative.

The forward link downlinks to the user terminals are preferably operated in broadband TDM, shared by all user terminals located within the same beam and the return link uplinks are preferably multiple access F/TDMA links.

The forward link router may be arranged to route successive frames independently in accordance with an interconnection matrix complying with a table stored in memory and computed by a network control centre which allocates the frames on the forward link uplink beams at each gateway. Similarly, the return link router can be arranged to route carriers independently in accordance with an interconnection matrix complying with a table stored in memory and computed by a network control centre which allocates the carriers on the return link to each gateway.

The present invention can be used in isolation or in combination with complementary payloads on the same satellite or complementary payloads carried by another satellite co-located in the same orbital slot.

According to a second aspect of the present invention there is provided a satellite which may be used in a communication system having a terrestrial segment comprising access gateways to terrestrial networks and user terminals, wherein the satellite has a multi-beam telecommunication payload comprising;

a forward link router for routing signals multiplexed in time from a forward link uplink beam from the gateways on a frame basis to a forward link downlink beam to the user terminals, a return link router for routing signals multiplexed in frequency and time from a return link uplink beam from the user terminals on a frequency bank basis to a return link downlink beam to the gateways, and a mesh communication router for receiving signals multiplexed in frequency and time from a return link uplink beam from the user terminals, generating signals multiplexed in time and routing these signals to a forward link downlink beam to the user terminals.

The satellite according to the second aspect of the present invention has the same advantages and the same preferred and alternative embodiments as are discussed above in relation to the satellite communication system according to the first aspect of the present invention.

According to a third aspect of the present invention there is provided a method of satellite communication for a satellite communication system; comprising the steps of;

at gateways to terrestrial networks, generating signals, multiplexing them in time and transmitting these signals to the satellite on a forward link uplink beam, on-board the satellite, routing the signals multiplexed in time from a forward link uplink beam on a frame basis to a forward link downlink beam to user terminals, at user terminals, generating access signals bound for a gateway and mesh signals bound for another user terminal, multiplexing the access and mesh signals in frequency and time so that the access signals are carried by access carriers and mesh signals are carried by mesh carriers and transmitting the access and mesh signals to the satellite on a return link uplink beam, on board the satellite, routing access carriers from a return link uplink beam on a frequency bank basis to a return link downlink beam to the gateways and processing mesh signals from a return link uplink beam to generate signals multiplexed in time and routing these signals multiplexed in time to a forward link downlink beam.

The method may comprise the steps of dynamically allocating mesh resource and access resource on the return link uplink and receiving all the carriers on the return link uplink in a return link router on-board the satellite for routing access carriers to a return link downlink and routing mesh carriers to a mesh processor for processing mesh. Alternatively, the mesh resource and the access resource can be statically allocated and the method can comprise the steps of receiving the access carriers in a return link router on-board the satellite for routing access carriers to a return link downlink and receiving the mesh carriers in a mesh processor for processing the mesh.

BRIEF DESCRIPTION OF THE DRAWINGS

The present invention will now be described with reference to the accompanying Figures in which.

Figure 1:
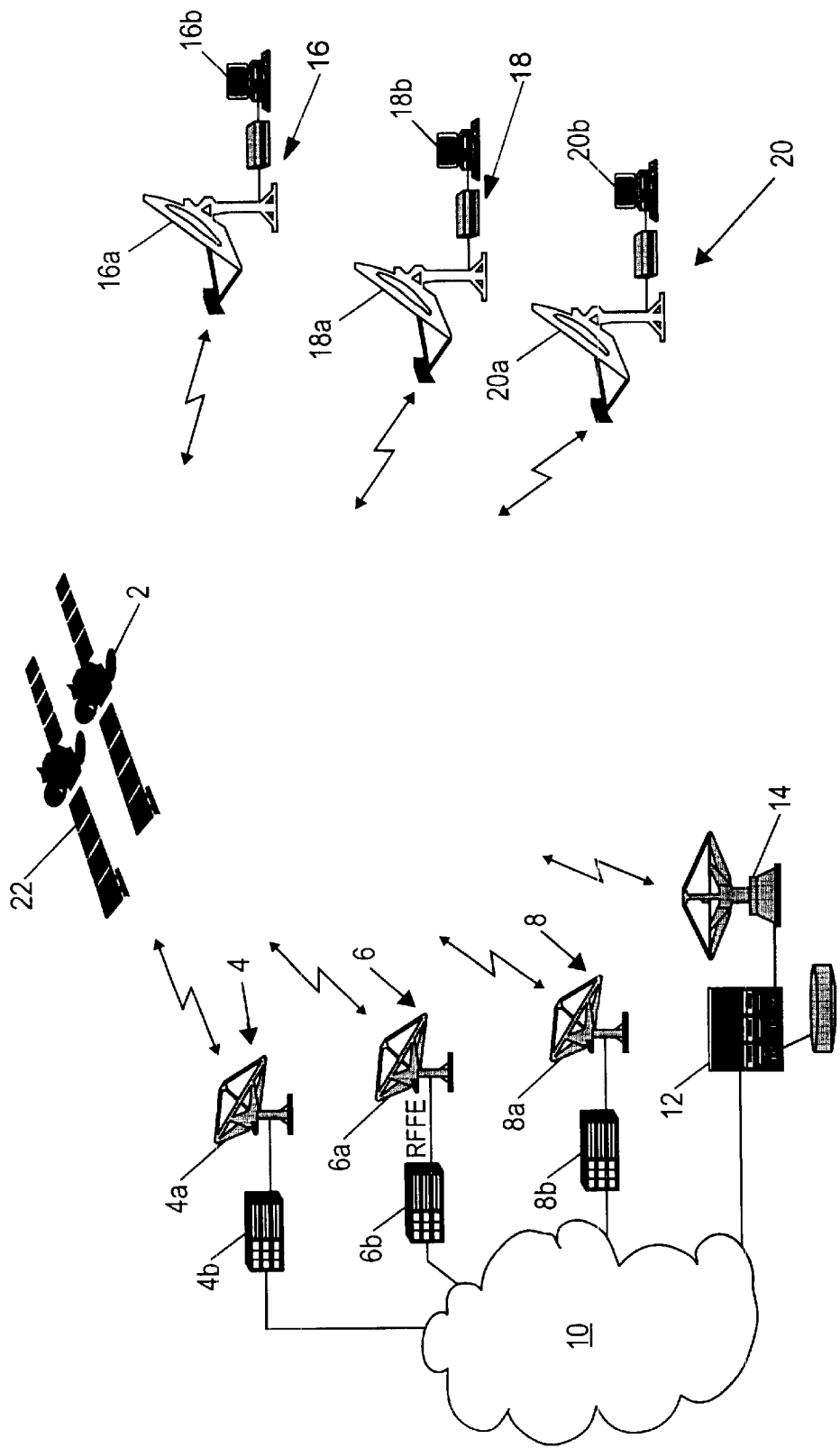
FIG. 1 shows schematically the general architecture of a system according to a first embodiment of the present invention.

The satellite telecommunication system illustrated schematically in FIG. 1 comprises at least one multi-beam satellite (2), stationed in a geostationary orbit. At least one terrestrial access gateway (4, 6, 8) to the terrestrial network (10) is located within each beam of the satellite (2). Each gateway (4, 6, 8) incorporates a radio-frequency linking means (4a, 6a, 8a) to the satellite (2) and a switch (4b, 6b, 8b). Generally, such telecommunication systems are arranged such that a single gateway (4, 6, 8) will fall within the footprint of each beam of the satellite (2). The gateways (4, 6, 8) are the access points to the satellite telecommunication system from the public/private network side.

The terrestrial network (10) to which the gateways (4, 6, 8) provide access is connected to a network control centre or NCC (12) which controls the configuration of the physical forward and return paths via the satellite (2), on the basis of predicted traffic requirements or actual demand. The gateways (4, 6, 8) manage the physical resources allocated to them by the NCC (12) and direct connections between the satellite (2) and the appropriate part of the terrestrial network (10) based on instructions provided to them by the NCC (12).

The terrestrial network (10) is also linked to the satellite (2) via the NCC (12) by a satellite remote control centre (14).

User terminals or SAUs (16, 18, 20), which may be fixed or mobile and may be of different types in terms of pass band requirements, can be linked into the terrestrial network (10) via the satellite (2) and generally comprise an external radio frequency linking means (16a, 18a, 20a) and internal part (16b, 18b, 20b). The user terminals (16, 18, 20) are the access points to the satellite telecommunication system from the user side.

The satellite has a telecommunications payload with three telecommunication chains.

The first chain is the forward or outward link from a gateway (4, 6, 8) to a user terminal (16, 18, 20) and is operated in broadband TDM, shared by all the user terminals within the same beam. The satellite (2) routes the broadband TDM messages (from the gateways (4, 6, 8)) from the forward link uplinks, frame by frame, to the destination beams on the forward link downlinks.

The second chain is the return link from a user terminal (16, 18, 20) to a gateway (4, 6, 8) via a satellite (2) and is operated in F/TDMA mode. The satellite (2) routes F/TDMA carriers requiring access to the network (10) via a gateway, so called access carriers (from the user terminals (16, 18, 20)) on the return link uplinks transparently, ie. without regeneration, to the destination gateway (4, 6, 8) on a return link downlink.

The third chain is the mesh connectivity chain. The satellite (2) has a mesh connectivity processor as part of its payload for providing a means for 'one-hop' communications (ie. communications which are direct from user terminal via the satellite to user terminal without being routed via a gateway) between user terminals (16, 18, 20) in different beams of the satellite. The mesh connectivity processor of the satellite (2) takes F/TDMA carriers requiring access to other user terminals, so called mesh communications (from the user terminals (16, 18, 20)) on the return link uplink and generates TDM messages and routes them to the appropriate destination beam on the forward link downlink.

Two different configurations of the payload of satellite (2) are described below with reference to FIGS. 2 and 3 below.

Figure 2:
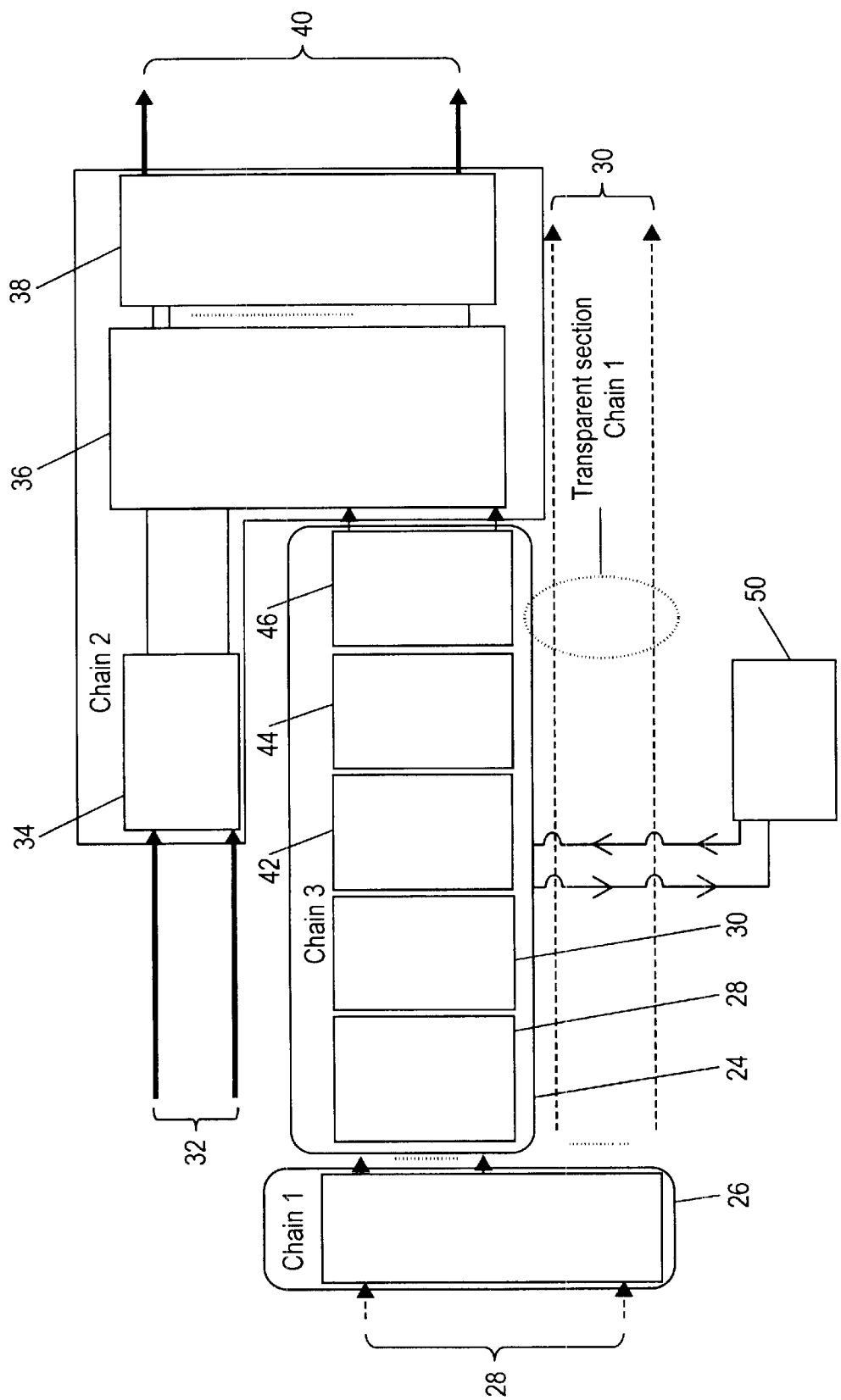
FIG. 2 shows schematically the configuration of a first embodiment of a satellite payload for a satellite used in the system shown in FIG. 1.

In the FIG. 2 configuration, the F/TDMA carriers from all the return link uplink beams (28) are input into a Chain 1 carrier router (26) which routes mesh carriers to the mesh processor (24), ie. into Chain 3, and routes the remaining access carriers on a frequency bank (ie. a group of carriers) basis, transparently, to the relevant beam on the return link downlink (30), ie. Chain 1 routing.

Chain 2 operates as follows. The TDM streams (32) from the gateways, ie. on the forward link uplink are all received by an input module (34). The input module (34) demodulates and partially decodes the TDM streams and sends them to routing module (36). The input module (34) may also carry out a buffering function. The routing module (36) takes the frames from the input module and multiplexes them with frames from the mesh processor (24) (Chain 3) and transmits the resulting TDM frames to an output module (38). The output module (38) codes, modulates and transmits the TDM frames generated by the routing module (36) as broadband TDM streams to the user terminals via the outward link downlink.

The mesh processor (24) comprises a group of multi-frequency receivers (28), operating according to an MF/TDMA shared access scheme. The receivers (28) demodulate, decode (at least partially) and demultiplex the MF/TDMA bursts it receives and transmits them to a shared memory (30). If consistent data rates for the inputs of the shared memory (30) of the mesh processor (24) and the Chain 2 input module (34) are required, then the shared memory (30) may have to insert null packets between some of the packets it receives from the receivers (24).

A formatting module (42) which receives packets from the shared memory (30) is used to format the packets embedded in the TDMA bursts on the return link uplink so that they have the same format as the signals output from the Chain 2 input module (34). As an example, the DVB-S standard EN 300421 specifies the structure of the TS packets which make up DVB continuous streams. If the air interface of the forward path follows this standard then the formatting module (42) will have to encapsulate packets coming from the shared memory (30) within TS packets, generate a TS header and apply a Reed Solomon coding to the TS packets with a coding rate which is typically equal to that used in Chain 2.

A shared memory routing function (44), typically located after the formatting module (42) routes packets generated by the formatting module (42) so that they occupy the correct time slot to allow them access to the correct destination beam on the forward link downlink after Chain 2 processing in the Chain 2 routing module (36) and Chain 2 output module (38).

A shared memory frame scheduler (46) coupled with the shared memory (30) and the shared memory routing function (44) extracts frames according to a frame time plan and transmits them to the Chain 2 routing module (36).

In FIG. 2 all the MF/TDMA carriers on the return link uplink are input into the carrier router (26) which can direct the carriers either to the Chain 3 mesh processor (24) or the Chain 1 transparent section, as required. This enables efficient sharing of the return link uplink resource between mesh (Chain 3) and access (Chain 1) communication. This added flexibility is at the cost of complexity in that the number of Chain 1 input and output ports are increased. In the payload configuration shown in FIG. 3 this complexity is removed, with a commensurate decrease in flexibility by splitting the return link uplink resource (28) statically between carriers (28a) that are dedicated to access communications and are input into Chain 1 and carriers (28b) that are dedicated to mesh communications and are input into Chain 3. This reduces the number of input and output ports in Chain 1. However, such a design reduces the efficiency of use of the frequency resource on the return link uplink and is less robust to market uncertainties and market evolution.

Figure 3:
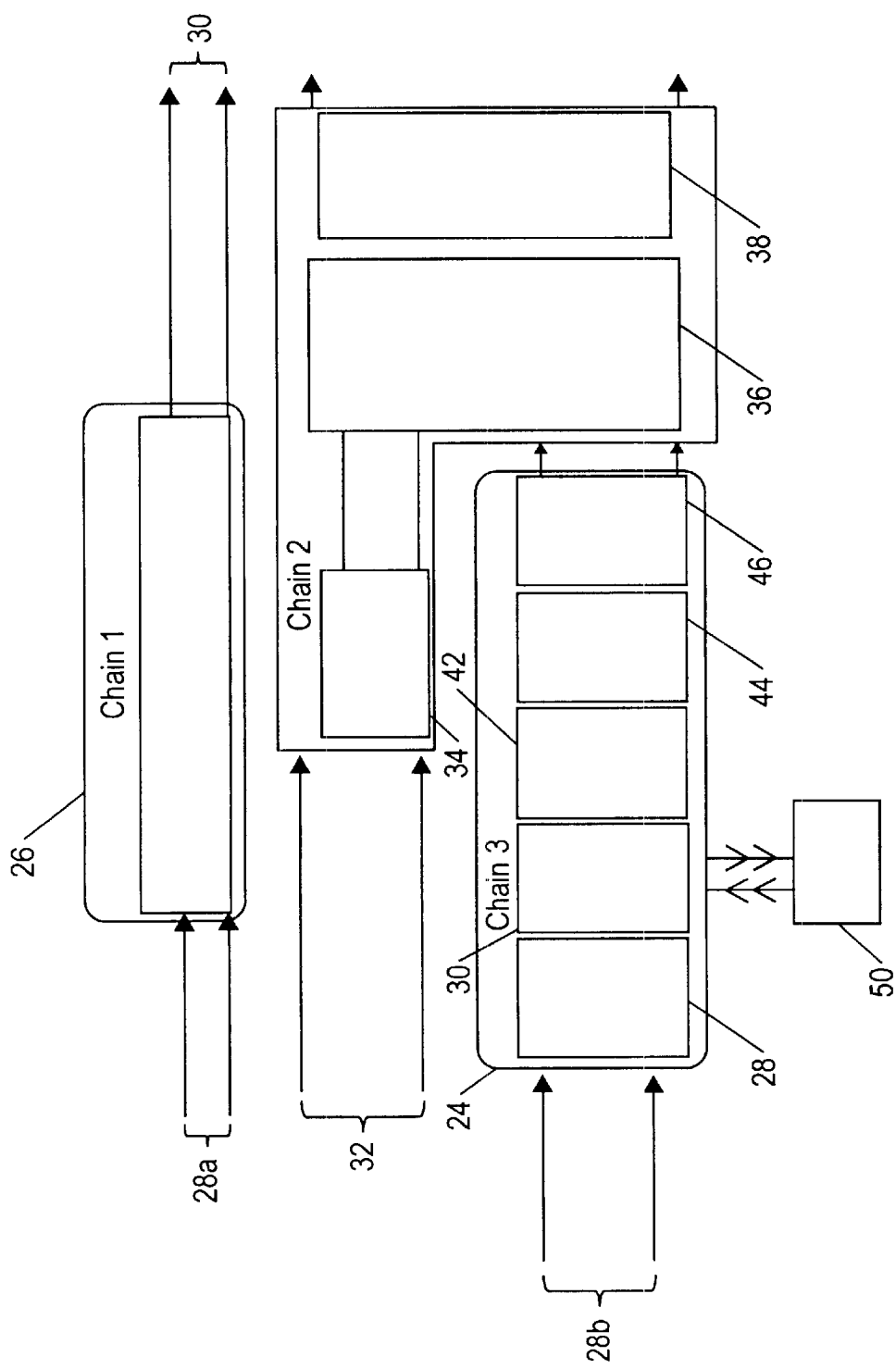
FIG. 3 shows schematically the configuration of a second embodiment of a satellite payload for a satellite used in the system shown in FIG. 1

In FIG. 3 like parts are identified by the same numerals as for FIG. 2. In the FIG. 3 configuration, the F/FTDMA carriers from the return link uplink beams (28) are split into two groups. A first group (28a) is input into the Chain 1 carrier router (26) which routes the carriers (28a) on a frequency bank (ie. a group of carriers) basis, transparently, to the relevant beam on the return link downlink (30).

The remaining carriers (28b) on the return link uplink are received directly by the mesh processor (24) which works in the same way as the mesh processor in FIG. 2 to generate TDM frames and input them into the Chain 2 routing module

(36) for transmission on the forward link downlink by the Chain 2 output module (38).

The TDM streams (32) from the gateways, ie. on the forward link uplink are all received by a Chain 2 input module (34). The input module (34) demodulates and partially decodes the TDM streams and sends them to routing module (36). The input module (34) may also carry out a buffering function. The routing module (36) takes the frames from the input module and multiplexes them with frames from the mesh processor (24) (Chain 3) and transmits the resulting TDM frames to an output module (38). The Chain 3 output module (38) codes, modulates and transmits the TDM frames generated by the routing module (36) as broadband TDM streams to the user terminals via the outward link downlink.

The system according to the present invention can use two different methods for routing MF/TDMA packets. In a first method a routing label is embedded in each packet header and routing tables are used to route the packets in the Chain 2 routing module (36) and in the Chain 3 mesh processor (24). The routing table, which maps packet routing labels to queues, is communicated to the satellite (2) in some way, for example via the satellite remote control centre (TT&C) (14). In a second method a Burst/Cell Time Plan is used to route packets in specific time/frequency slots to specific queues. The Burst/Cell Time Plan which maps TDMA frequency/frame offset tags to queues, is communicated to the satellite via some means, for examples via the satellite remote control centre (TT&C) (14).

Optionally, a bandwidth on demand (BoD) controller (50) for dealing with mesh communications (Chain 3) can be added to the system. The BoD controller (50) receives bandwidth requests from user terminals (16, 18, 20) via the return link uplink and allocates carriers on the return link uplink to the user terminals. The carriers controlled by the BoD controller (50) will be those received by the multi-frequency receiver (28) of the mesh processor (24). These carriers can be statically allocated to mesh communications, as in FIG. 3, or dynamically allocated to mesh communications, as in FIG. 2. The BoD controller (50) can either be added to the payload of the satellite (2) or can be ground based.

The payload of the satellite (2) as shown in FIGS. 2 or 3 can be used in conjunction with either conventional (ie. transparent, eg. bent-pipe) or 'carrier routing' transponders to provide additional user terminal to gateway connectivity. The additional transponders may be carried by the satellite (2) or by an additional satellite (22) co-located in the same orbital slot as the satellite (2).

The payloads of the satellite (2) as described above in relation to FIGS. 2 and 3 can be built with different numbers of carriers on the return link uplink and downlink and different numbers of TDM streams on the forward link uplink and downlink. The preferred configuration has an equal number of uplink and downlink TDM streams and a total MF/TDMA capacity which is typically smaller than, for example 10% of, the TDM capacity. This is due to both technical reasons and expected usage reasons. The usage reason is that access to terrestrial networks is expected to use more bandwidth than user to user communications. The technical reason is that the MF/TDMA receiver and shared memory are likely to consume proportionally more energy than the frame router (Chain 2—routing module (36)) used for TDM streams.

The Chain 2 routing module (36) is configured to provide capacity from each gateway beam (ie. each link on the forward link uplink) to each forward link downlink beam. The allocation of capacity between the beams is determined by expected levels of use and can vary with time. Each user terminal, for example terminal (16), listens on a single TDM forward link down link and in this way receives frames from many gateways. In a preferred implementation, the TDM frames carry DVB formatted information and each gateway uses a separate PID to identify each user terminal. This allows user terminals to recognise frames destined for them which may be IP/MPE, ATM or otherwise encapsulated.

Each user terminal (16, 18, 20) has an associated home gateway (4, 6, 8) which is responsible for allocating signalling resource to the terminal. To send to a gateway, for example to request information or to send information, a user terminal (16, 18, 20) tunes its transmitter (16a, 18a, 20a) to a carrier that will be received by the gateway with which the terminal wants to communicate. The home gateway associated with the user terminal allocates bandwidth to the terminal on the desired carrier.

For user terminal to user terminal communication, a user terminal can either utilise a double hop connection via a gateway or a single hop communication through the mesh processor (26) of the satellite (2). The single hop communication through the mesh processor (26) has the advantage of reducing the end-to-end time delay associated with the communication and occupies half the satellite bandwidth required for the double hop link. The use of the single hop connection makes end-to-end time delay sensitive applications, such as video conferencing, more viable.

To access a mesh processor connection, the user terminal (16, 18, 20) tunes its transmitted to a carrier that will be received by the multi-frequency receivers (28) of the mesh processor (24). It is allocated bandwidth on this carrier by its home gateway which must obtain the allocation from the NCC (12) or the BoD controller (5). When the user terminal initially requests resource to make a mesh connection, the request must go to the home gateway, which will relay the request to the NCC (12) or BoD controller (5) as appropriate. Once the mesh resource is allocated to the user terminal the user terminal will tune its transmitter to a carrier that will be received by the multi-frequency receivers (28) of the mesh processor (24). Further bandwidth requests can be routed by via the mesh processor or the home gateway, as appropriate.

What is claimed is:

1. A satellite communication system having a spatial segment comprising at least one satellite carrying a multi-beam telecommunication payload and a terrestrial segment comprising access gateways to terrestrial networks each gateway arranged to communicate with a/the satellite via a forward link uplink beam and a return link downlink beam and user terminals each arranged to communicate with a satellite via a forward link downlink beam and a return link uplink beam, wherein the forward link carries signals multiplexed in time and the return link carries signals multiplexed in frequency and time, the payload comprising;

a forward link router for routing signals multiplexed in time from a forward link uplink beam on a frame basis to a forward link downlink beam, a return link router for routing signals multiplexed in frequency and time from a return link uplink beam on a frequency bank basis to a return link downlink beam, and a mesh communication router for receiving signals multiplexed in frequency and time from a return link uplink beam, generating signals multiplexed in time and routing these signals to a forward link downlink beam.

2. A system according to claim 1 wherein the satellite is in a geostationary orbit.

3. A system according to claim 1 wherein return link uplink signals are received by the return link router and the return link router routes signals relating to a mesh communication to the mesh processor.

4. A system according to claim 1 wherein a proportion of the return link uplink signals are received directly by the return link router and a proportion of the return link uplink signals are received directly by the mesh processor.

5. A system according to claim 1 wherein each user terminal is allocated a home gateway to which the user terminal must make initial requests for resource on the system additionally comprising a bandwidth on demand controller (BoD) located in each home gateway.

6. A system according to claim 1 additionally comprising a bandwidth on demand controller located within the payload of the satellite.

7. A system according to claim 1 wherein the return link router is transparent.

8. A system according to claim 1 wherein the forward link router is regenerative.

9. A system according to claim 1 wherein the forward link downlinks to the user terminals are operated in broadband TDM, shared by all user terminals located within the same beam.

10. A system according to claim 1 wherein the return link uplinks are multiple access F/TDMA links.

11. A system according to claim 1 wherein the forward link router, routes successive frames independently in accordance with an interconnection matrix complying with a table stored in memory and computed by a network control centre which controller allocates the frames on the forward link uplink beams at each gateway.

12. A system according to claim 1 wherein the return link router, routes carriers independently in accordance with an interconnection matrix complying with a table stored in memory and computed by a network control centre which controller allocates the carriers on the return link to each gateway.

13. A satellite which may be used in a communication system having a terrestrial segment comprising access gateways to a terrestrial network and user terminals, wherein the satellite has a multi-beam telecommunication payload comprising;

a forward link router for routing signals multiplexed in time from a forward link uplink beam from the gateways on a frame basis to a forward link downlink beam to the user terminals, a return link router for routing signals multiplexed in frequency and time from a return link uplink beam from the user terminals on a frequency bank basis to a return link downlink beam to the gateways, and a mesh communication router for receiving signals multiplexed in frequency and time from a return link uplink beam from the user terminals, generating signals multiplexed in time and routing these signals to a forward link downlink beam to the user terminals.

14. A satellite according to claim 13 wherein the satellite is in a geostationary orbit.

15. A satellite according to claim 13 wherein return link uplink signals are received by the return link router and the return link router routes signals relating to a mesh communication to the mesh processor.

16. A satellite according to claim 13 wherein a proportion of the return link uplink signals are received directly by the return link router and a proportion of the return link uplink signals are received directly by the mesh processor.

17. A satellite according to claim 13 additionally comprising a bandwidth on demand controller within its payload.

18. A satellite according to claim 13 wherein the return link router is transparent.

19. A satellite according to claim 13 wherein the forward link router is regenerative.

20. A satellite according to claim 13 wherein the forward link downlinks to the user terminals are operated in broadband TDM, shared by all user terminals located within the same beam.

21. A satellite according to claim 13 wherein the return link uplinks are multiple access F/FTDMA links.

22. A satellite according to claim 13 wherein the forward link router, routes successive frames independently in accordance with an interconnection matrix complying with a table stored in memory and computed by a network control centre which control centre also allocates the frames on the forward link uplink beams at each gateway.

23. A satellite according to claim 13 wherein the return link router, routes carriers independently in accordance with an interconnection matrix complying with a table stored in memory and computed by a network control centre which control centre also allocates the carriers on the return link to each gateway.

24. A method of satellite communication for a satellite communication system; comprising the steps of;

at gateways to terrestrial networks, generating signals, multiplexing them in time and transmitting these signals to the satellite on a forward link uplink beam, on-board the satellite, routing the signals multiplexed in time from a forward link uplink beam on a frame basis to a forward link downlink beam to user terminals, at user terminals, generating access signals bound for a gateway and mesh signals bound for another user terminal, multiplexing the access and mesh signals in frequency and time so that the access signals are carried by access carriers and mesh signals are carried by mesh carriers and transmitting the access and mesh signals to the satellite on a return link uplink beam, on board the satellite, routing access carriers from a return link uplink beam on a frequency bank basis to a return link downlink beam to the gateways and processing mesh signals from a return link uplink beam to generate signals multiplexed in time and routing these signals multiplexed in time to a forward link downlink beam.

25. A method according to claim 24, comprising the step of placing the satellite in a geostationary orbit.

26. A method according to claim 24, comprising the steps of dynamically allocating mesh resource and access resource on the return link uplink and receiving all the carriers on the return link uplink in a return link router on-board the satellite for routing access carriers to a return link downlink and routing mesh carriers to a mesh processor for processing mesh signals from a return link uplink beam to generate signals multiplexed in time and routing these signals multiplexed in time to a forward link downlink beam.

27. A method according to claim 24, comprising the steps of statically allocating mesh resource and access resource on the return link uplink and receiving the access carriers in a return link router on-board the satellite for routing access carriers to a return link downlink and receiving the mesh carriers in a mesh processor for processing mesh signals from a return link uplink beam to generate signals multiplexed in time and routing these signals multiplexed in time to a forward link downlink.

28. A method according to claim 24 comprising the step of allocating a home gateway to each user terminal to which the user terminal must make initial requests for resource on the system and using bandwidth on demand controllers (BoD) in each home gateway.

29. A method according to claim 24 using a bandwidth on demand controller within the payload of the satellite.

30. A method according to claim 24 comprising the step of routing access carriers from a return link uplink beam on a frequency bank basis to a return link downlink beam to the gateways transparently.

31. A method according to claim 24 comprising the step of routing the signals multiplexed in time from a forward link uplink beam on a frame basis to a forward link downlink beam to user terminals regeneratively.

32. A method according to claim 24 comprising the step of operating the forward downlinks to the user terminals in broadband TDM, shared by all user terminals located within the same beam.

33. A method according to claim 24 comprising the step of using multiple access F/TDMA links for the return link uplinks.

34. A method according to claim 24 wherein, on-board the satellite, successive frames on the forward link uplink are routed independently in accordance with an interconnection matrix complying with a table stored in memory and computed by a network control centre which control centre also allocates the frames on the forward link uplink beams at each gateway.

35. A method according to claim 24 wherein, on-board the satellite, the access carriers are routed independently in accordance with an interconnection matrix complying with a table stored in memory and computed by a network control centre which control centre also allocates the carriers on the return link to each gateway.

* * * * *